United States Patent
Ijaz

(10) Patent No.: US 10,069,872 B2
(45) Date of Patent: Sep. 4, 2018

(54) ARCHITECTURE TO ESTABLISH SERVERLESS WEBRTC CONNECTIONS

(71) Applicant: Verizon Patent and Licensing Inc., Arlington, VA (US)

(72) Inventor: Hassan Ijaz, Alpharetta, GA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 151 days.

(21) Appl. No.: 14/335,449

(22) Filed: Jul. 18, 2014

(65) Prior Publication Data
US 2016/0021148 A1    Jan. 21, 2016

(51) Int. Cl.
G06F 15/16 (2006.01)
H04L 29/06 (2006.01)
H04L 29/08 (2006.01)
H04L 12/58 (2006.01)

(52) U.S. Cl.
CPC .......... H04L 65/1069 (2013.01); H04L 51/10 (2013.01); H04L 67/104 (2013.01)

(58) Field of Classification Search
CPC .................. H04L 65/1069; H04L 67/104
USPC .................................. 709/206, 204
See application file for complete search history.

(56) References Cited

U.S. PATENT DOCUMENTS

| 7,233,979 B2* | 6/2007 | Dickerman | H04L 12/581 709/203 |
| 8,433,294 B2* | 4/2013 | Blight | H04L 51/38 370/313 |
| 8,437,757 B2* | 5/2013 | Varma | H04L 12/58 455/432.1 |
| 8,588,233 B1* | 11/2013 | Lohner | H04L 61/2007 370/392 |
| 8,812,020 B2* | 8/2014 | Marsico | H04W 4/021 370/328 |
| 2005/0286538 A1* | 12/2005 | Oberle | H04L 29/06027 370/395.54 |
| 2013/0043302 A1* | 2/2013 | Powlen | G06F 17/30725 235/375 |
| 2013/0276075 A1* | 10/2013 | Gong | H04W 76/02 726/5 |

(Continued)

OTHER PUBLICATIONS

U.S. Appl. No. 14/109,294, entitled Mobile Device Pass Through for Signaling Messages, filed Dec. 17, 2013.

*Primary Examiner* — David R Lazaro
*Assistant Examiner* — Mariegeorges A Henry

(57) ABSTRACT

Peer-to-peer connection methods and systems are provided. A first client device receives a request to initiate a peer-to-peer connection with a second client device. Responsive to the request, the first client device presents an offer message that includes first address information associated with the first client device. A first mobile device captures the presented offer message and sends the captured offer message to the second client device via a wireless communication network. The first client device receives, via the first mobile device, a response message over the wireless communication network from the second client device. The response message includes second address information associated with the second client device. The first client device initiates the peer-to-peer connection with the second client device, responsive to the second address information in the received response message.

20 Claims, 15 Drawing Sheets

(56) References Cited

U.S. PATENT DOCUMENTS

| | | | |
|---|---|---|---|
| 2014/0149512 A1* | 5/2014 | Leitch | H04L 67/1061 709/204 |
| 2014/0269646 A1* | 9/2014 | Ramasamy | H04W 76/023 370/338 |
| 2015/0189090 A1* | 7/2015 | Regan | H04M 3/53333 455/413 |

* cited by examiner

```
//assign moz api objects to common var
var PeerConnection = window.mozRTCPeerConnection;
var IceCandidate = window.mozRTCIceCandidate;
var SessionDescription = window.mozRTCSessionDescription;
//servers
var server = {
    iceServers: [
        {url: "stun:stun.l.google.com:19302"}
    ]
}
//create connection point
var options = {
    optional: [
        {DtlsSrtpKeyAgreement: true},
        {RtpDataChannels: true}
    ]
}
var pc = new PeerConnection(server, options);
//create offer
var errorHandler = function (err) {
    console.error(JSON.stringify(err));
};
var constraints = {
    mandatory: {
        OfferToReceiveAudio: true,
        OfferToReceiveVideo: true
    }
};
pc.createOffer(function (offer) {
    console.log(offer);
    pc.setLocalDescription(offer);
    console.log(JSON.stringify(offer));
}, errorHandler, constraints);
```

FIG. 9A

```
var remoteSessionDescription = new RTCSessionDescription(offerSDP);
connection.setRemoteDescription(remoteSessionDescription);

connection.createAnswer(getAnswerSDP, onfailure, sdpConstraints);
function getAnswerSDP(responseSDP) {
    connection.setLocalDescription(responseSDP);

console.log(JSON.stringify(responseSDP));};
```

FIG. 9B

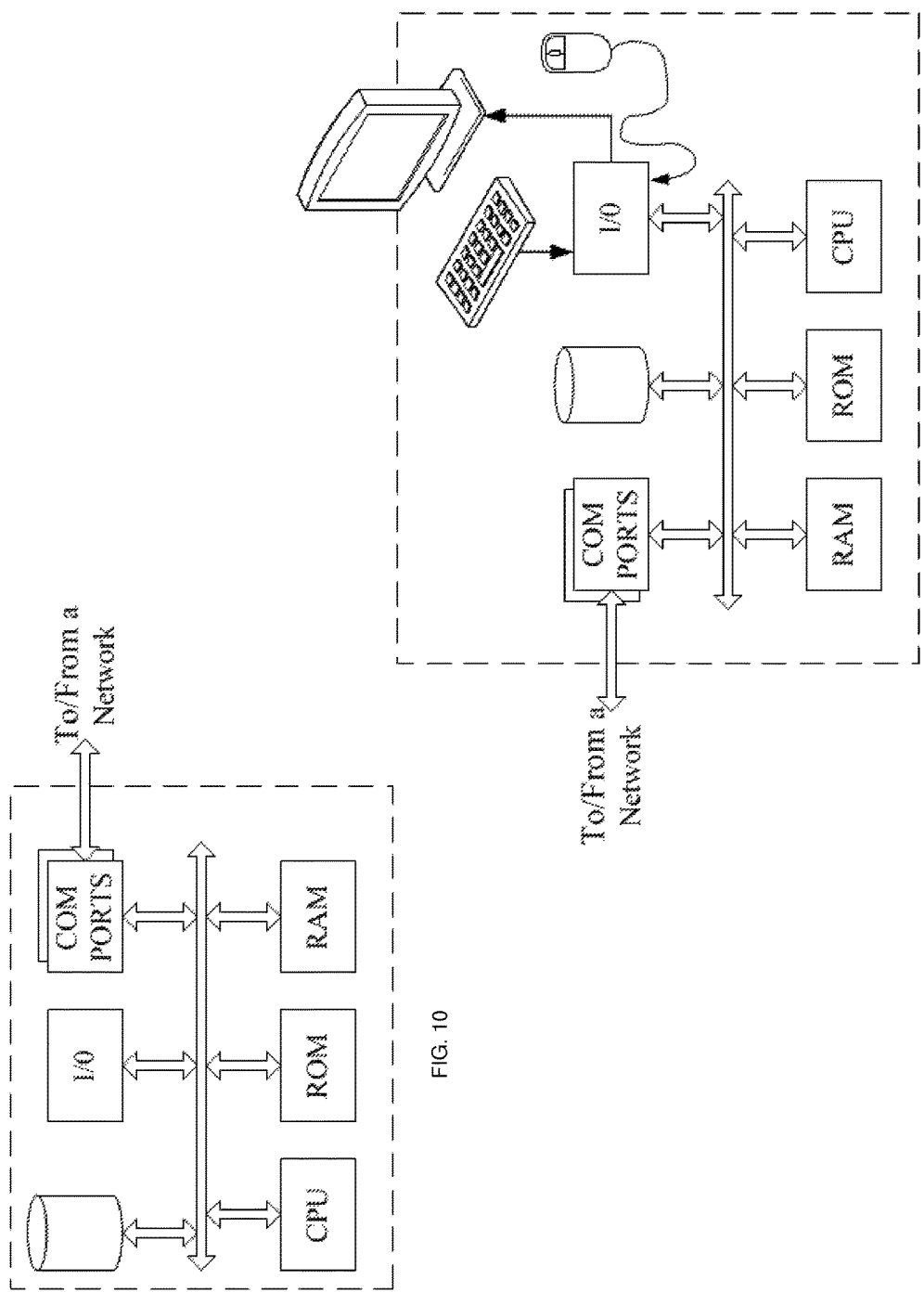

US 10,069,872 B2

ARCHITECTURE TO ESTABLISH SERVERLESS WEBRTC CONNECTIONS

BACKGROUND

In recent years, the explosion of technology has continued. New ideas have emerged to mix together various software and hardware solutions to provide the user with intuitive experiences that simplify the use of these new technologies. Currently, with the influx of various smart devices as well as the emergence of software solutions for browsers, a true platform independent method of communications may be possible.

Current web browsers allow peer-to-peer (P2P) communications between two clients, for example, through a Web Real-Time Communication (WebRTC) application programming interface (API). The P2P session enables quick exchange of audio, video and other data streams between the client machines. However, the two clients do not have a way to initiate the P2P connection. Thus, the clients are still dependent on a dedicated server in the network to establish the P2P connection.

This current architecture has various shortcomings. For example, there are bandwidth and maintenance costs for running a dedicated server. The dedicated server is active at all times, even when clients are not using it, and the server idle time results in a waste of resources. Furthermore, clients are dependent on their ability to connect to the server. Even in cases where no network issues hinder two clients communicating with each other, a network issue between the server and any one of the clients may prevent the connection from being established, creating a bottleneck. In addition, dependence on a dedicated server may present various security and privacy issues, and reduce the flexibility of the network. For example, a compromised server can allow malicious code to monitor and compromise the communication between the two clients.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 9A and 9B show examples of software code that may be used to establish a P2P communication session.

FIG. 10 is a simplified functional block diagram of a computer that may be configured as a host or server in the system of FIG. 1.

FIG. 11 is a simplified functional block diagram of a personal computer or other work station or terminal device.

DETAILED DESCRIPTION OF EXAMPLES

Figure 1:
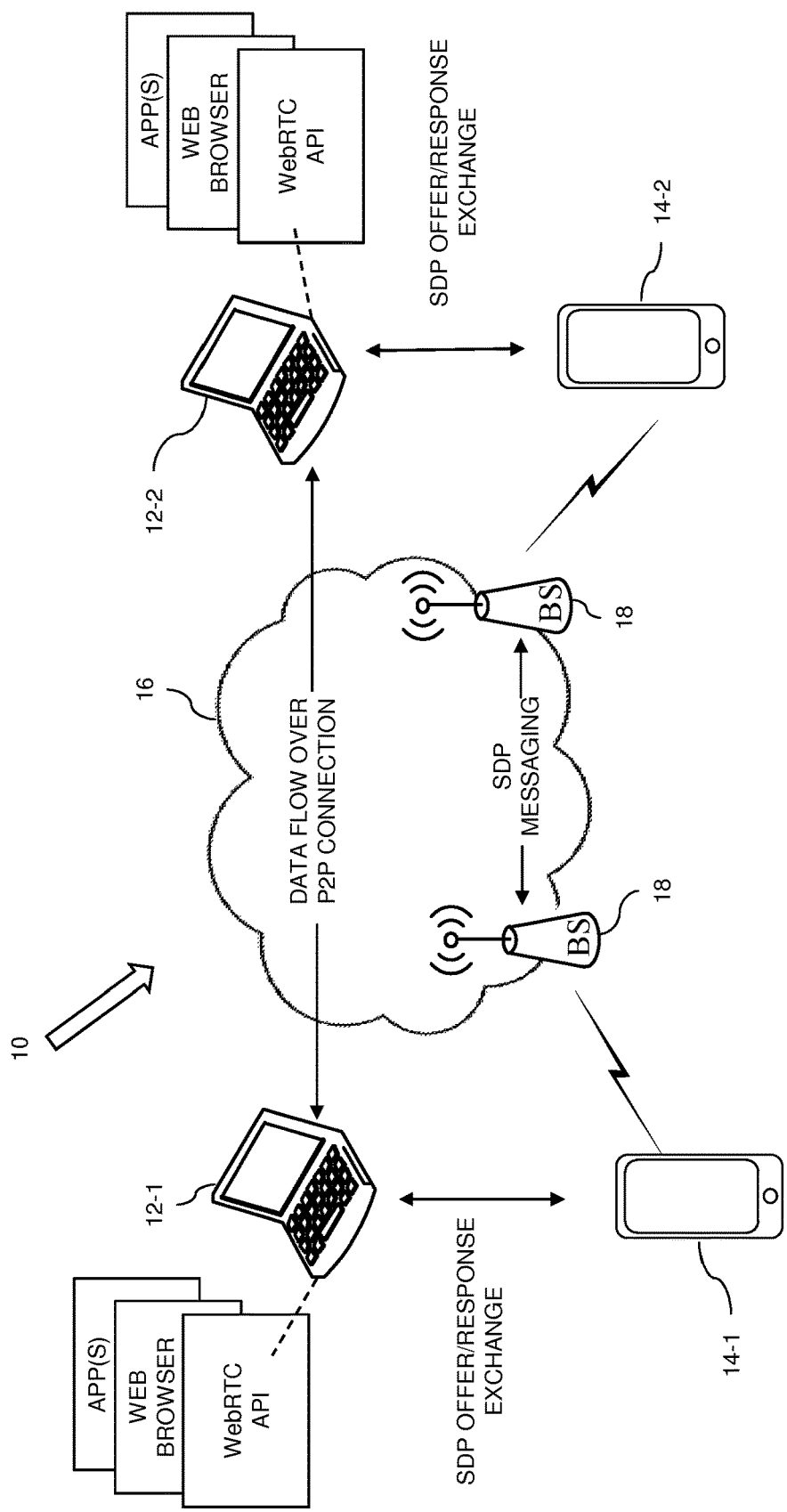
FIG. 1 is a high-level functional block diagram of an example of a system that supports an example of a P2P connection service.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

As above, a need exists to take advantage of existing technology, for example WebRTC APIs, to establish P2P connections between clients, without the use of a dedicated server. WebRTC is an open standard for multimedia (e.g., voice, video, file sharing) communication (e.g., one-to-one communication or one-to-many communication) over a P2P connection that is embedded in a web browser. Instead of plug-in software, WebRTC uses JavaScript code for call setup. Although current WebRTC connections are considered to be P2P, the current procedure for establishing these connections uses a dedicated server in the network.

For example, a current WebRTC connection is established in the following manner. Client A generates a Session Description Protocol (SDP) offer. The SDP offer includes a set of rules that define how a multimedia session can be set up to allow all end points to participate in the session. Client A sends the offer message to a dedicated server running in the network. The server transmits the offer to Client B. Client B generates an SDP response responsive to the SDP offer and transmits a response message to the server. The server transmits response to Client A. When Client A accepts the response, a connection is established between Client A and Client B.

The various examples disclosed herein relate P2P connection methods and systems. The disclosed examples eliminate the need of a dedicated server, allowing clients to use existing technology as the conduit to establish WebRTC connections. In the description herein, a P2P communication session refers to a virtual or logical session between two client devices, although the discussion will often refer to the communication as a "connection" for convenience. A first client device receives a request from a user of the first client device to initiate a P2P connection with a second client device. Responsive to the request, the first client device presents an offer message to the user of the first client device that includes first address information associated with the first client device. A mobile device captures the presented offer message and sends the captured offer message to the second client device via a wireless communication network. The first client device receives, via the mobile device, a response message over the wireless communication network from the second client device. The response message includes second address information associated with the second client device. The first client device initiates the P2P connection with the second client device, responsive to the second address information in the received response message. This permits the mobile device to mediate the P2P connection between the first and second client devices without using a server that is normally dedicated to this task.

The examples described herein use existing technology and mobile devices that clients own to exchange the WebRTC "offer" and "response" messages, instead of a central dedicated server. This provides a more flexible architecture that is much closer to being truly peer-to-peer. Because the example P2P connection service does not use a dedicated server, there are no server bandwidth and maintenance costs, reduced network bottlenecks and more secure/private connections. The example P2P connection service may be used, for example, for connecting a customer service representative to a customer, connecting two client devices to share data or connecting two client devices to stream videos and save CDN (Content Delivery Network) resources.

Reference now is made in detail to the examples illustrated in the accompanying drawings and discussed below. FIG. 1 illustrates the system architecture of the P2P connection service.

FIG. 1 illustrates a system 10 offering a variety of communication services, including communications for wireless data by mobile devices 14-1, 14-2 of various users as well as client devices 12-1, 12-2. In some examples, the client device 12-1 shares local wireless data communications with the mobile device 14-1 via a wireless access point (not shown). In some examples, the client device 12-1 may not be capable of communicating with the mobile device 14-1 via local wireless data communication. In both examples, information may still be exchanged between the client device 12-1 and the mobile device 14-1, via multimedia input/output interfaces on each device and/or via a direct connection between devices. The example shows simply two mobile devices 14-1 and 14-2, two client devices 12-1 and 12-2 and a communication network 16. The devices 14-1 and 14-2 are examples of mobile devices that may be used for establishing a P2P connection between the client devices 12-1 and 12-2, although devices 14-1 and 14-2 also support a variety of other functions and services through communication network 16. However, the network 16 will provide similar communications for many other similar users as well as for mobile devices/users that do not participate in the P2P connection service. The network 16 provides mobile wireless communications services to those devices as well as to other mobile devices (not shown), for example, via a number of base stations (BSs) 18. The network 16 also provides communications services to the client devices 12-1 and 12-2.

The example shows simply two client devices 12-1 and 12-2, however, multiple client devices may utilize respective mobile devices 14-1 and 14-2 for the P2P connection service. The present techniques may be implemented in any of a variety of available networks 16 and/or on any type of mobile device compatible with such a network 16, and the drawing shows only a very simplified example of a few relevant elements of the network 16 for purposes of discussion here.

Mobile devices 14-1, 14-2 can take the form of portable handsets, smart-phones or personal digital assistants, although they may be implemented in other form factors. Program applications, including an application to assist in the P2P connection service can be configured to execute on many different types of mobile devices 14-1, 14-2. For example, a mobile device application can be written to execute on a binary runtime environment for mobile (BREW-based) mobile device, a Windows Mobile based mobile device, Android, iOS for iPhone or iPad, Java Mobile, or RIM based mobile device such as a BlackBerry or the like. Some of these types of devices can employ a multi-tasking operating system.

Examples of client devices 12-1, 12-2 include a laptop, a personal computer (PC), a tablet, an e-reader or any other device capable of participating in P2P communication via a web browser. Client devices 12-1, 12-2 are capable of communicating with the network 16 via a local data communications network. The local data communications network, for example, is Wi-Fi provided via a wireless access point or Ethernet over cable or optical fiber connected directly to a local router. In some examples, the client devices 12-1, 12-2 are also capable of communicating with the respective mobile devices 14-1, 14-2 (e.g., via the local data communications network, via a direct physical connection and/or via multimedia input/output interfaces), but does not rely on the respective mobile devices 14-1, 14-2 to communicate with the network 16 for all purposes.

For example, client device 12-1 accesses web applications via network 16 directly, but sends P2P connection request messaging (e.g., an SDP offer message) through mobile device 14-1. This is because client device 12-1 does not know the Internet Protocol (IP) address of client device 12-2 (and similarly for client device 12-2). Client device 12-1 obtains the IP address of client device 12-2 via P2P connection request messaging between mobile device 14-1 and mobile device 14-2 (which communicates with the client device 12-2). For example, from an SDP response message generated by client device 12-2 (in response to an SDP offer message generated by client device 12-1). Client device 12-2, similarly, obtains the IP address of client device 12-1 (e.g., from the SDP offer message form client device 12-1). Client devices 12-1, 12-2 execute, for example, a web browser to establish communications with and/or via network 16. Client devices 12-1, 12-2, in such an example, use the web browser to establish communications with a web application via network 16. Each of client devices 12-1, 12-2 includes a web browser and a WebRTC API for P2P multimedia communication (e.g., for voice communication, video communication, file sharing, etc.) over the network 16. Each of client devices 12-1, 12-2 also includes program applications to assist in the P2P connection service.

Each mobile device 14-1, 14-2 communicates over the air with a base station 18 and through the traffic network 16 for various voice and data communications, e.g., through the Internet with a server and/or with application servers.

For purposes of further discussion, we will focus on functions in support of the P2P connection service.

In one example, a user of (first) client device 12-1 desires to initiate a P2P communication session with a user of (second) client device 12-1. When a request is placed, as described in further detail below in relation to FIG. 4, first client device 12-1 generates an offer message and requests that (first) mobile device 14-1 capture the offer message. The first mobile device 14-1 captures the offer message presented by the first client device 12-1 and sends the captured offer message to second client device 12-2 via (second)

mobile device 14-2. Thus, the captured offer message is passed through network 16, from first mobile device 14-1 to second mobile device 14-2. In turn, second mobile device 14-2 provides the received offer message to second client device 12-2. The offer message includes the IP address of the first client device 12-1. Thus, second client device 12-2 obtains the IP address of the first client device 12-1 via the offer message.

Responsive to the offer message, the second client device 12-2 generates a response message and requests that the second mobile device 14-2 capture the response message. The response message includes the IP address of the second client device 12-2. The second mobile device 14-2 captures the response message presented by the second client device 12-2 and sends the captured response message to the first client device 12-1 via the first mobile device 14-1. Thus, the captured response message is passed through network 16, from second mobile device 14-1 to first mobile device 14-1. In turn, first mobile device 14-1 provides the received response message to first client device 12-1. Because the response message includes the IP address of the second client device 12-2, the first client device 12-1 obtains the IP address of the second client device 12-2 and a P2P communication session can be initiated between the client devices 12-1 and 12-2.

Once the communication session is established, data related to the communication (e.g., voice, video and/or data files) is exchanged directly between the client device 12-1 and the client device 12-2 without passing through the respective mobile devices 14-1 and 14-2.

The mobile device capture and transmission of SDP offer/response messages (as part of the P2P connection procedure) under consideration here may be provided by touch screen type mobile devices as well as by non-touch type mobile devices. Hence, our simple example shows each mobile device 14-1, 14-2 as a touch type mobile device, however, the mobile device 14-1 and/or the mobile device 14-2 may alternatively be a non-touch screen type mobile device. Implementation of the P2P connection procedure will involve at least some execution of programming in the mobile devices as well as implementation of user input/output functions and data communications through the network 16, from the mobile devices. It may be useful to consider the functional elements/aspects of examples of two types of mobile devices 14-1, 14-2, at a high-level.

Figure 2:
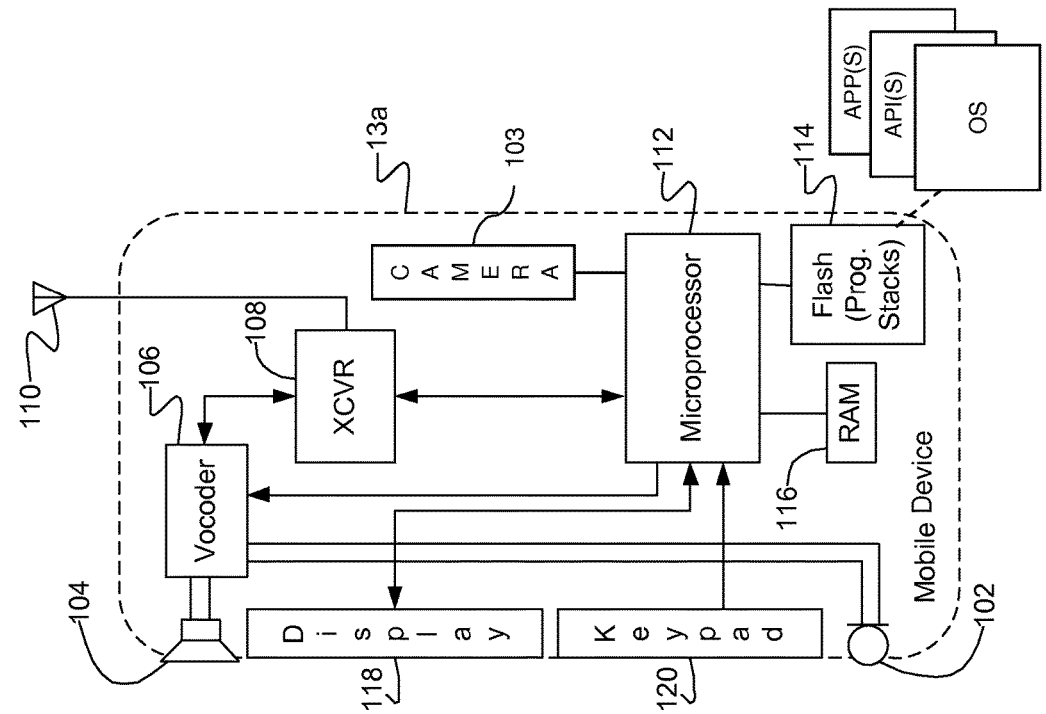
FIG. 2 is a high-level functional block diagram of an exemplary non-touch type mobile device as may perform the P2P connection service through a network/system like that shown in FIG. 1.

For purposes of such discussion, FIG. 2 provides a block diagram illustration of an example of a non-touch type mobile device 13a. Either or both of the mobile devices 14-1, 14-2 of FIG. 1 may be implemented as a non-touch mobile device as shown at 13a in FIG. 2. Although the mobile device 13a may be a smart-phone or may be incorporated into another device, such as a personal digital assistant (PDA) or the like, for discussion purposes, the illustration shows the mobile device 13a is in the form of a handset. The handset embodiment of the mobile device 13a functions as a normal digital wireless telephone station. For that function, the station 13a includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications. In another example, the microphone 102 may be used to capture an SDP offer message output from a speaker of the client device 12-1 (described further below with respect to respect to FIG. 4). The microphone 102 supplies the digital representation of the audio signal to the microprocessor 112, which stores the representation as an audio file in one of the device memories.

In some examples, the mobile device 13a also includes a digital camera 103 for capturing still images and/or video. The camera 103 includes image sensors that are used in capturing images, which are generally saved in the mobile device 13a in various file formats. Although the camera 103 is shown as an integrated camera of the mobile device 13a, it should be noted that the camera 103 may be implemented using an external camera device communicatively coupled to the mobile device 13a. The user may, for example, operate one or more keys of keypad 120 to capture a still image, which essentially activates the camera 103 to create a digital representation of an optical image visible to the image sensor through the lens of the camera. For example, the image may be of the SDP offer message displayed on client device 12-1 (described further below with respect to respect to FIG. 4). The camera 103 supplies the digital representation of the image to the microprocessor 112, which stores the representation as an image file in one of the device memories. The microprocessor 112 may also process the image file to generate a visible image output as a presentation to the user on the display 118, when the user takes the picture or at a later time when the user recalls the picture from device memory. Video images could be similarly processed and displayed. An audio file or the audio associated with a video clip could be decoded by the microprocessor 112 or the vocoder 106, for output to the user as an audible signal via the speaker 104.

For digital wireless communications, including wireless data communications, the handset 13a also includes at least one digital transceiver (XCVR) 108. Today, the handset 13a would be configured for digital wireless communications using one or more of the common network technology types. The concepts discussed here encompass embodiments of the mobile device 13a utilizing any digital transceivers that conform to current or future developed digital wireless communication standards. The mobile device 13a may also be capable of analog operation via a legacy network technology.

The transceiver 108 provides two-way wireless communication of information, such as vocoded speech samples and/or digital information, in accordance with the technology of the network 16. The transceiver 108 also sends and receives a variety of signaling messages in support of the various voice and data services provided via the mobile device 13a and the communication network. The transceiver 108 also sends and receives SDP offer/response messages for establishing a P2P connection between the client devices 12-1, 12-2. Each transceiver 108 connects through radio frequency (RF) send and receive amplifiers (not separately shown) to an antenna 110. The transceiver may also support various types of mobile messaging services, such as short message service (SMS), enhanced messaging service (EMS) and/or multimedia messaging service (MMS).

The mobile device 13a includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102, camera 103 and speaker 104 may be used as the physical input output elements of the graphical user interface (GUI), for multimedia (e.g., audio and/or video) communications. Of course other user interface elements may be used, such as a trackball, as in some types of PDAs or smart phones. In addition to normal telephone and data related input/output (including message input and message display functions), the user interface elements also may be used for display of menus and other information to the user and user input of selections (such as for functions relating to the P2P connection establishment procedure).

A microprocessor 112 serves as a programmable controller for the mobile device 13a, in that it controls all operations of the mobile device 13a in accord with programming that it executes, for all normal operations, and for operations involved in the P2P connection procedure under consideration here. In the example, the mobile device 13a includes flash type program memory 114, for storage of various "software" or "firmware" program routines and mobile configuration settings, such as mobile directory number (MDN) and/or mobile identification number (MIN), etc. The mobile device 13a may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, application programming interface(s) (APIs), call processing software, and vocoder control software, and any of a wide variety of other applications, such as client browser software and short message service software, any of which may operate with active user intervention or in the background without user intervention. The APIs include P2P connection establishment functionality for capturing, delivering, receiving, and processing SDP offer/response messages. The memories 114, 116 also store various data, such as telephone numbers and server addresses, downloaded data such as multimedia content, SDP messages (captured and/or received SDP offer and/or SDP response messages) and various data input by the user. Programming stored in the flash type program memory 114, sometimes referred to as "firmware," is loaded into and executed by the microprocessor 112.

As outlined above, the mobile device 13a includes a processor, and programming stored in the flash memory 114 configures the processor so that the mobile device is capable of performing various desired functions, including in this case the functions involved in the technique for establishing a P2P connection between the client devices 12-1, 12-2.

Figure 3:
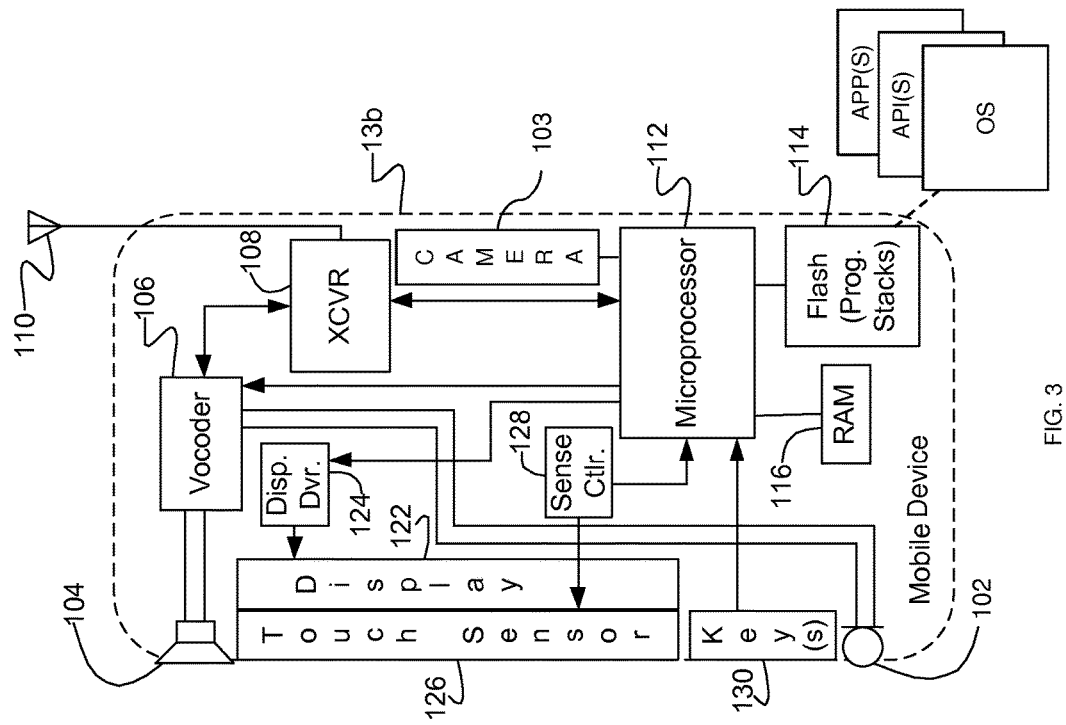
FIG. 3 is a high-level functional block diagram of an exemplary touch screen type mobile device as may perform the P2P connection service through a network/system like that shown in FIG. 1.

FIG. 3 is a block diagram illustration of an example of a touch screen type mobile device 13b. Either or both of the mobile devices 14-1, 14-2 of FIG. 1 may be implemented as a touch screen mobile device as shown at 13b in FIG. 3. Although possibly configured somewhat differently, at least logically, a number of the elements of the touch screen type mobile device 13b are similar to the elements of mobile device 13a, and are identified by like reference numbers in FIG. 3. For example, the touch screen type mobile device 13b includes a microphone 102, speaker 104 and vocoder 106, for audio input and output functions, much like in the earlier example. In some examples, the touch screen type mobile device 13b also includes the camera 103, for the capture of still images and/or video. The mobile device 13b also includes at least one digital transceiver (XCVR) 108, for digital wireless communications, although the handset 13b may include an additional digital or analog transceiver. The concepts discussed here encompass embodiments of the mobile device 13b utilizing any digital transceivers that conform to current or future developed digital wireless communication standards. As in the mobile device 13a, the transceiver 108 provides two-way wireless communication of information, such as vocoded speech samples and/or digital information, in accordance with the technology of the network 16. The transceiver 108 also sends and receives a variety of signaling messages in support of the various voice and data services provided via the mobile device 13b and the communication network. The transceiver 108 also sends and receives SDP offer/response messages via the communication network 16 for establishing a P2P connection between the client devices 12-1, 12-2. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of mobile device 13a, a microprocessor 112 serves as a programmable controller for the mobile device 13b, in that it controls all operations of the mobile device 13b in accord with programming that it executes, for all normal operations, and for operations involved in the P2P connection procedure under consideration here. In the example, the mobile device 13b includes flash type program memory 114, for storage of various program routines and mobile configuration settings. The mobile device 13b may also include a non-volatile random access memory (RAM) 116 for a working data processing memory. Of course, other storage devices or configurations may be added to or substituted for those in the example. Similar to the implementation of mobile device 13a, the flash type program memory 114 stores firmware such as a boot routine, device driver software, an operating system, API(s), call processing software, and vocoder control software, and any of a wide variety of other applications, such as client browser software and short message service software, any of which may operate with active user intervention or in the background without user intervention. The APIs include P2P connection establishment functionality for capturing, delivering, receiving, and processing SDP offer/response messages. As with the mobile device 13a, the memories 114, 116 also store various data, including SDP messages (captured and/or received SDP offer and/or SDP response messages).

Hence, as outlined above, the mobile device 13b includes a processor, and programming stored in the flash memory 114 configures the processor so that the mobile device is capable of performing various desired functions, including in this case the functions involved in the technique for establishing a P2P connection between client devices 12-1, 12-2.

In the example of FIG. 2, the user interface elements included a display and a keypad. The mobile device 13b may have a limited number of keys 130, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the mobile device 13b in our example includes a display 122, which the microprocessor 112 controls via a display driver 124, to present visible outputs to the device user. The mobile device 13b also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile device 13b. The microphone 102 and speaker 104 may be used as additional user interface elements, for audio input and output, including to capture an audio representation of an SDP message (such as an SDP offer message and/or an SDP response message). The camera 103 may also be used as an additional user interface element to capture still images and/or video, including to capture a visual representation of an SDP message (such as an SDP offer message and/or an SDP response message).

The structure and operation of the mobile devices 13a and 13b, as outlined above, were described to by way of example, only.

Figure 4:
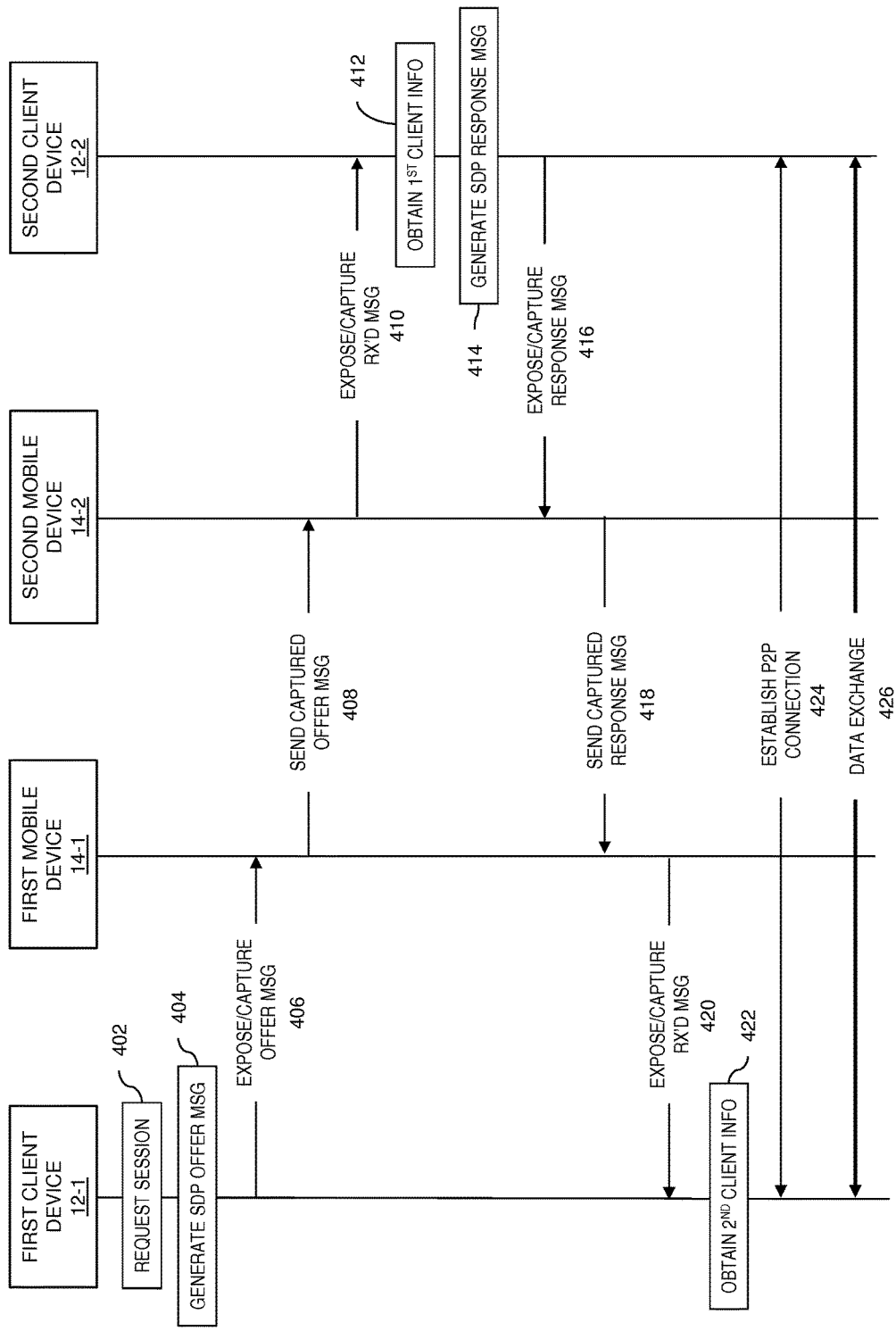
FIG. 4 is a signal flow diagram illustrating an example of establishing a P2P connection between client devices.

FIG. 4 is a signal flow diagram illustrating an example of establishing a P2P connection between client devices 12-1 and 12-2. In FIG. 4, the signal flow includes an interaction between the first client device 12-1, the first mobile device 14-1, the second mobile device 14-2 and the second client device 12-2. These applications were described in detail with respect to FIGS. 1-3. Therefore, for the sake of brevity, they are not described here in more detail.

Figure 6A:
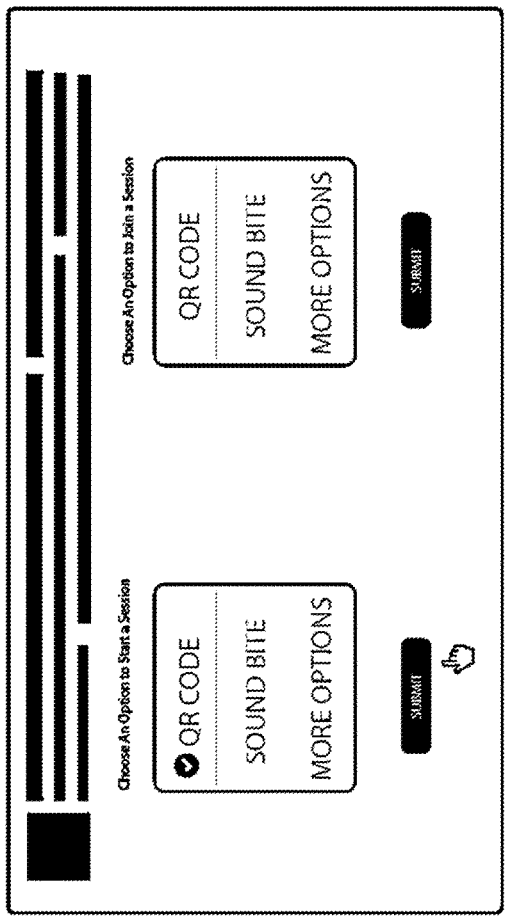
FIGS. 6A, 6B, 6C, 6D, 6E and 6F are sample screenshots illustrating an example P2P communication session request screen and an offer message that may be generated and sent from a first client device to a second client device via respective mobile devices, during P2P communication session establishment processing.

The process begins with receiving a request 402, at the first client device 12-1, from a user of the first client device 12-1 to initiate a P2P communication session with the second client device 12-2. For example, the user of the first client device 12-1 may use a web browser (FIG. 1) on the first client device 12-1 to initiate the request 402 (such as shown in FIG. 6A).

Responsive to the request 402, the first client device 12-1 generates an SDP offer message 404. The SDP offer message 404 indicates that the client device 12-1 requests initiation of a P2P communication session with the second client device 12-2. The SDP offer message includes IP address information of the first client device 12-1. The SDP offer message may also include other information related to the requested P2P communication session, such as, for example, protocols for transmission of data and/or what type(s) of data to exchange in the P2P communication session.

Figure 5:
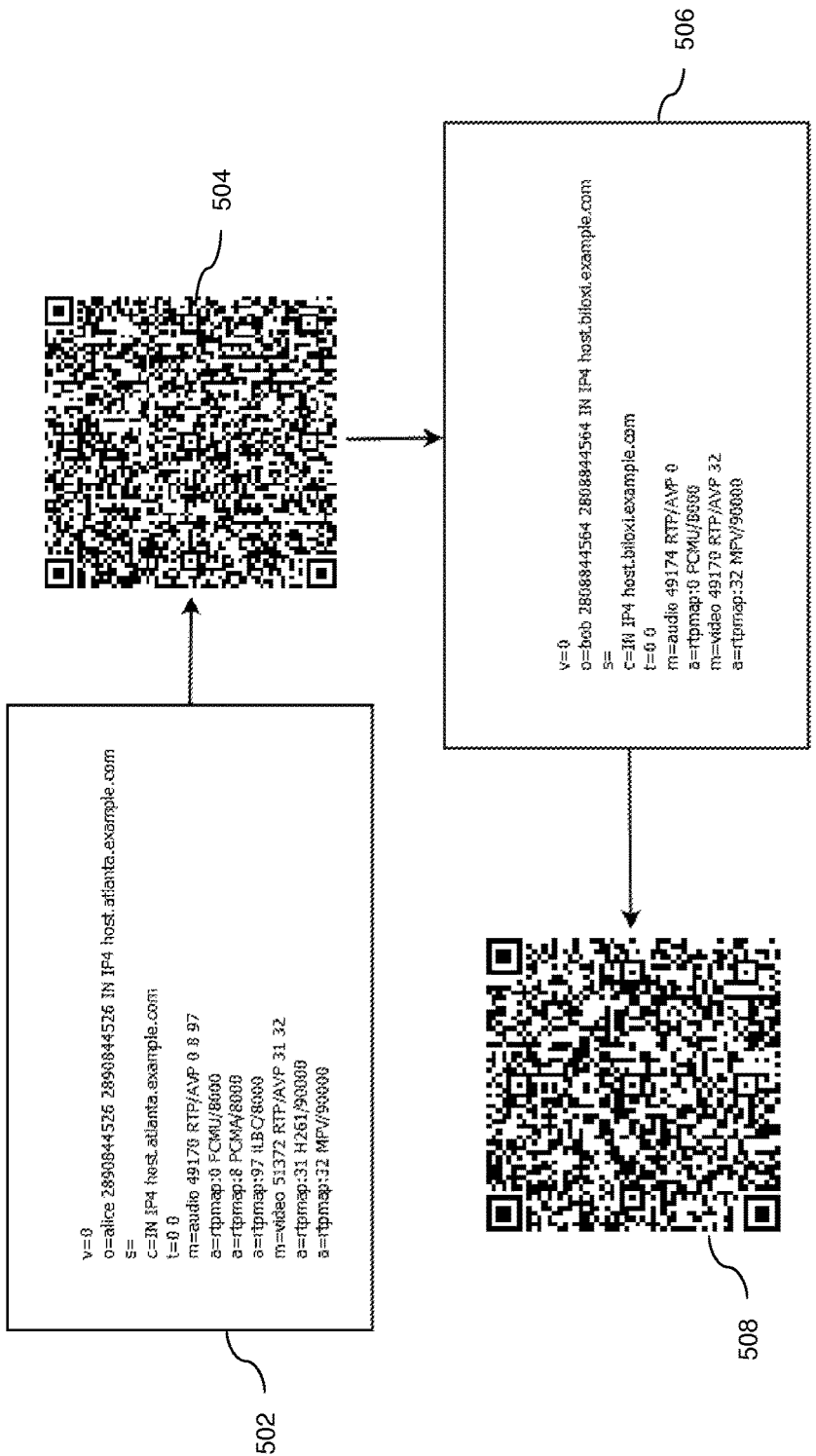
FIG. 5 is a diagram illustrating an example of Session Description Protocol (SDP) offer/response messages that may be embedded in Quick Response (QR) codes and used to establish a P2P connection.

The SDP offer message 404 may be represented in a variety of manners including, without being limited to, text, audio, images and/or video. For example, the SDP offer message may be represented as an encoded sound byte. In other examples, the SDP offer message may be embedded in a Quick Response (QR) code. For example, FIG. 5 illustrates a QR code 504 in which the SDP offer message 502 is embedded.

Figure 6B:
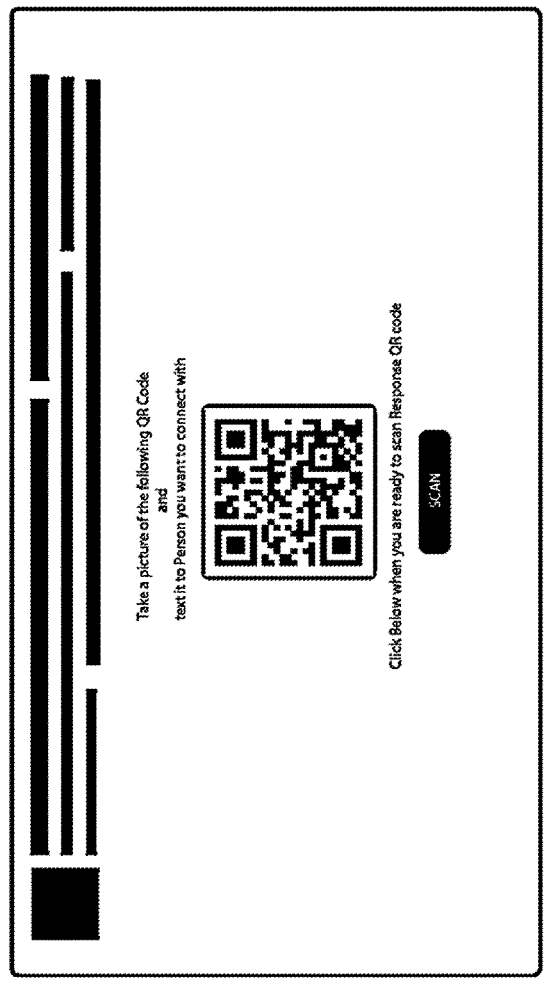

In step 406, the first client device 12-1 presents the SDP offer message 404 to the first mobile device 14-1 and the first mobile device 14-1 captures the message presented by client device 12-1. The first client device 12-1 may provide instructions to the user (e.g., as text, audio, an image and/or video) for presenting the SDP offer message 404 to the first mobile device 14-1 (such as shown in FIG. 6B). For example, the SDP offer message 404 may be presented (e.g., as text, audio, an image and/or video) via a display and/or an audio output interface on the first client device 12-1. The instructions to the user on first client device 12-1 may also request the user to activate an application (for example, a P2P connection application or other application) on the first mobile device 14-1 for capturing the exposed SDP offer message 404. Such an application on the first mobile device 14-1 presents the instructions, e.g., as text, audio, an image and/or video, for the user to capture the exposed SDP offer message (such as shown in FIG. 6C). The instructions may be presented via display 118 (or 122) and/or an audio output interface 104 on the first mobile device 14-1. The user of the first mobile device 14-1, responsive to the instructions, captures the exposed message via a camera and/or an audio input interface on the first mobile device 14-1. For example, the first mobile device 14-1 uses the camera 103 to capture the QR code 504 (FIG. 5) or an image. As another example, the first mobile device 14-1 uses the microphone 102 to capture an encoded sound byte. In some examples, the SDP offer message is sent from the first client device 12-1 to the first mobile device 14-1 via a short range transmission such as via Bluetooth and/or near field communication (NFC). In some examples, the SDP offer message is sent from the first client device 12-1 to the first mobile device 14-1 via a longer range transmission, such as via a local area data communications network.

In step 408, the first mobile device 14-1 sends the captured offer message to the second mobile device 14-2 via the network 16. In some examples, a P2P connection application on the first mobile device 14-1 presents instructions, e.g., as text, audio, an image and/or video, for the user to send the captured offer message to the second mobile device 14-2 (such as shown in FIG. 6E). For example, the captured offer message may be sent to the second mobile device 14-2, responsive to user input based on the instructions, as a mobile messaging service message (such as an SMS message, an EMS message and/or a MMS message), a voicemail message, an email, etc.

Figure 7A:
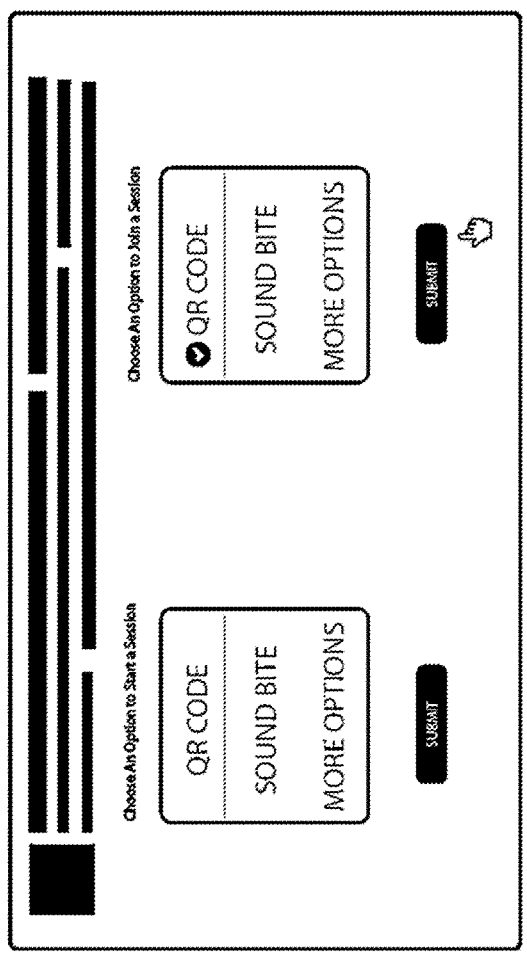
FIGS. 7A, 7B, 7C, 7D, 7E and 7F are sample screenshots illustrating an example P2P communication session joining screen and an response message that may be generated and sent from the second client device to the first client device via respective mobile devices, during P2P communication session establishment processing.
Figure 7B:
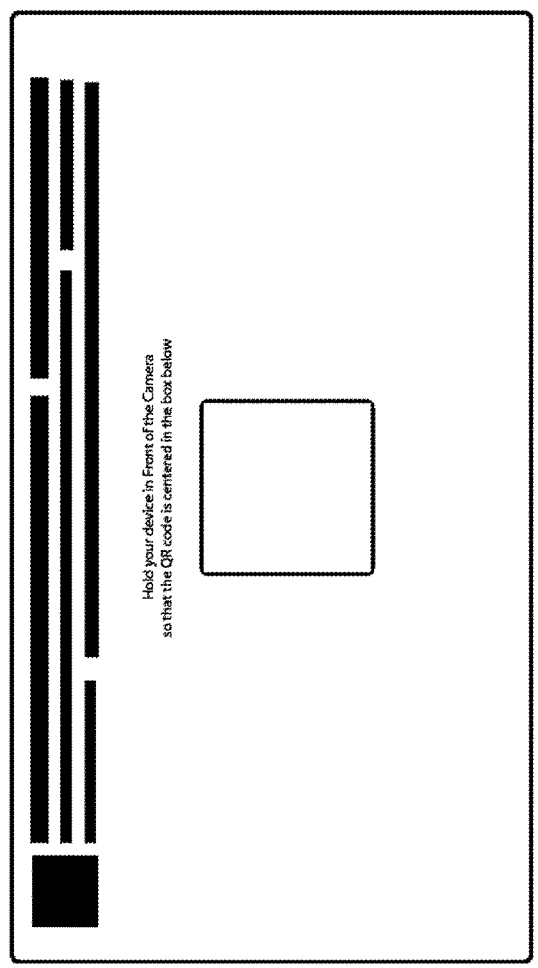

In step 410, the received offer message (received by the second mobile device 14-2) is exposed (i.e., presented) by the second mobile device 14-2 to the second client device 12-2 and the received message is captured by the second client device 12-2. For example, the second client device 12-2 may provide instructions to the user as text, audio, an image and/or video for presenting (exposing) the message received at the second mobile device 14-2 to the second client device 12-2 (such as shown in FIG. 7B). Similar to the exposure/capture step 406, the received SDP offer message may be presented via a display and/or an audio output interface on the second mobile device 14-2 and the message may be captured, responsive to the instructions, via a camera and/or an audio input interface on the second client device 12-2. In other examples, the received offer message may be transferred to the second client device 12-2 via a direct physical connection between the second mobile device 14-2 and the second client device 12-2, via a short-range communication or via a wireless communication over a local area data communications network between the second mobile device 14-2 and the second client device 12-2.

In some examples, the transmission mechanism for the received message between the second mobile device 14-2 and the second client device 12-2 (i.e., step 410) is the same as the transmission mechanism described above for the offer message (in step 406). For example, each of steps 406 and 410 may involve exposing an image on a display and capturing an image via a camera. In some examples, the transmission mechanism for transferring the message received between the second mobile device 14-2 and the second client device 12-2 (step 410) may be different from the transmission mechanism in step 406. For example, step 406 may involve exposing/capturing an image whereas step 410 may transfer the message via a direct physical connection. In general, the transmission mechanism for transferring a message between a client device 12 and a mobile device 14 may be the same or different in each of steps 406, 410, 416 and 420 (steps 416 and 420 described further below). In addition, the transmission mechanism for transfer of the received message to the second client device 12-2 (step 410) may be the same or different from the transmission mechanism to transfer the response message to the second mobile device 14-2 (step 416). Similarly, the transmission mechanism for transfer of the offer message to the first mobile device 14-1 (step 406) may be the same or different from the transmission mechanism to transfer the received message to the first client device 12-1 (step 420).

In step 412, the second client device 12-2 obtains the IP address information of the first client device 12-1. In some examples, the second client device 12-2 may receive a captured QR code (such as QR code 504) and extract the offer message (such as offer message 502) embedded in the QR code to obtain the IP address information.

Responsive to the captured offer message, the second client device generates an SDP response message 414. In some examples, the second client device 12-2 may request input from a user of the second client device 12-2 to join the requested communication session (such as shown in FIG. 7A). The SDP response message 414 may be generated responsive to user input agreeing to join the requested communication session.

The SDP response message 414 includes IP address information of the second client device 12-2, and may include other information related to the P2P communication session, such as protocols for transmission of data and/or what type(s) of data to exchange in the P2P communication session. In some examples, the SDP response message 414 may not include additional information other than the IP address information of the second client device 12-2, such as when the transmission protocol and/or data exchange information associated with the second client device 12-2 is already known by the first client device 12-1 (such as when this information is stored in a database from a previous communication session). In some examples, the SDP response message 414 also includes any SDP message fields that the SDP protocol designates as mandatory, such as a protocol version number, an originator and session identifier (e.g., username, identifier, version number, network address), a session name and/or a time description indicating a time that the session is active. In other examples, the generated response message 414 includes only the IP address information of the second client device 12-2, although in such a case, the response 414 may use a generic protocol instead of actual SDP. In such a case, the second mobile device 14-2, the first mobile device 14-1 or the first client device 12-1 uses the IP address information in the generated response message 414 and previously stored values of the relevant data for the SDP message fields to form the response message as an SDP-formatted message (i.e., a response message compliant with standard SDP). The SDP response message 414 may be represented similarly to SDP offer message 404, such as text, audio, images and/or video. In some examples, the SDP response message may be embedded in a QR code. For example, FIG. 5 illustrates a QR code 508 in which the SDP response message 506 is embedded.

Figure 7C:
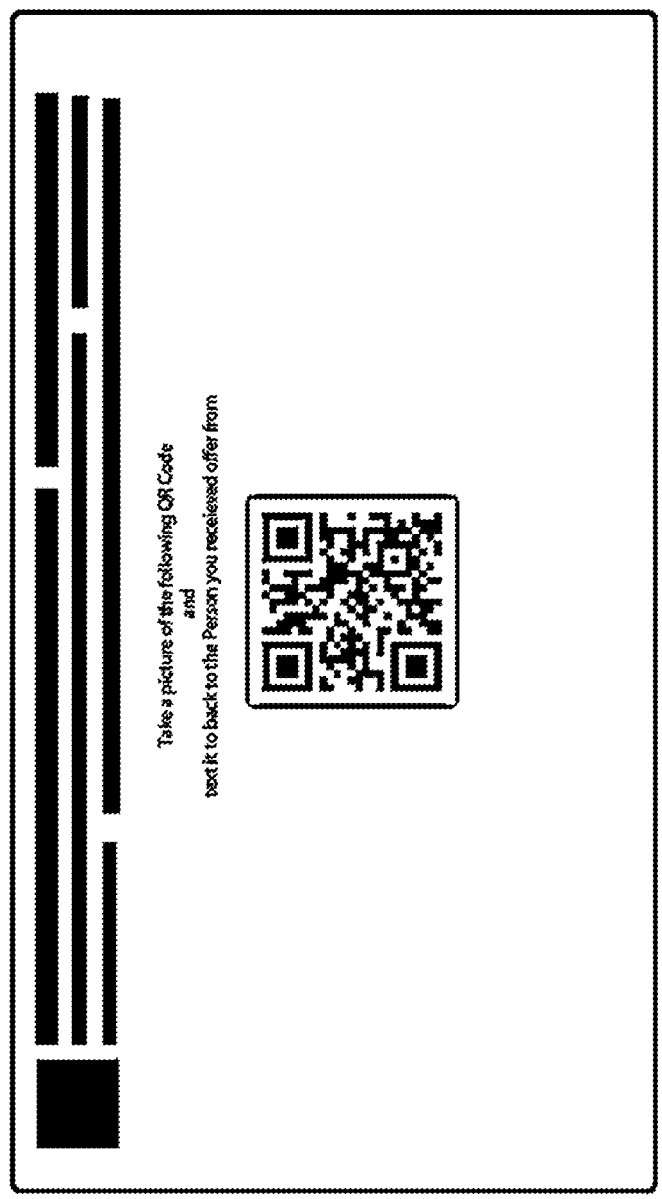

In step 416, the SDP response message 414 is exposed (i.e., presented) to the second mobile device 14-2 and the message is captured by the second mobile device 14-2, similar to step 406. For example, the second client device 12-2 may provide instructions to the user as text, audio, an image and/or video for presenting the SDP response message 414 to the second mobile device 14-2 (such as shown in FIG. 7C). The instructions to the user on the second client device 12-2 may also request the user to activate a P2P connection application on the second mobile device 14-2 for capturing the exposed response message (at step 416). A P2P connection application on the second mobile device 14-2 may present instructions, for example, as text, audio, an image and/or video, for the user to capture the exposed SDP response message (such as shown in FIG. 7D). In other examples, the SDP response message may be transferred to the second mobile device 14-2 via a direct physical connection between the second client device 12-2 and the second mobile device 14-2, or via a wireless communication over a local data communications network between the second client device 12-2 and the second mobile device 14-2.

In step 418, the second mobile device 14-2 sends the captured response message to the first mobile device 14-1 via the network 16, similar to step 408. In step 420, the received response message (received by the first mobile device 14-1) is exposed (i.e., presented) by the first mobile device 14-1 to the first client device 12-1 and the received response message is captured by the first client device 12-1, similar to step 410. For example, the first client device 12-1 may provide instructions to the user as text, audio, an image and/or video for presenting the response message received at the first mobile device 14-1 to the first client device 12-1 (such as shown in FIG. 8B).

In step 422, the first client device 12-1 obtains the IP address information of the second client device 12-2. In some examples, the first client device 12-1 may receive a captured QR code (such as QR code 508) and extract the response message (such as response message 506) embedded in the QR code to obtain the IP address information.

Responsive to the captured response message, the first client device 12-1 (that obtains the IP address of the second client device 12-2 in step 422) and the second client device 12-2 (that obtains the IP address of the first client device 12-1 in step 412) establishes a P2P connection (step 424) (such as a WebRTC connection), using the received respective IP addresses. In step 426, data is exchanged between the first client device 12-1 and the second client device 12-2 using the established P2P connection (step 424).

Figure 6D:
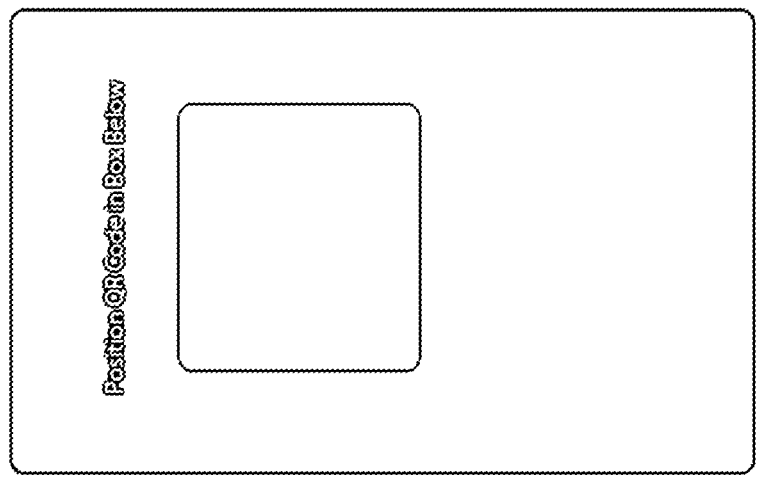
Figure 6C:
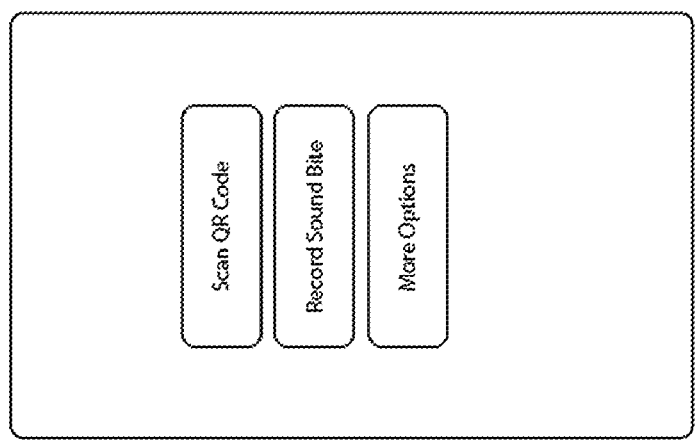
Figure 6F:
Figure 6E:
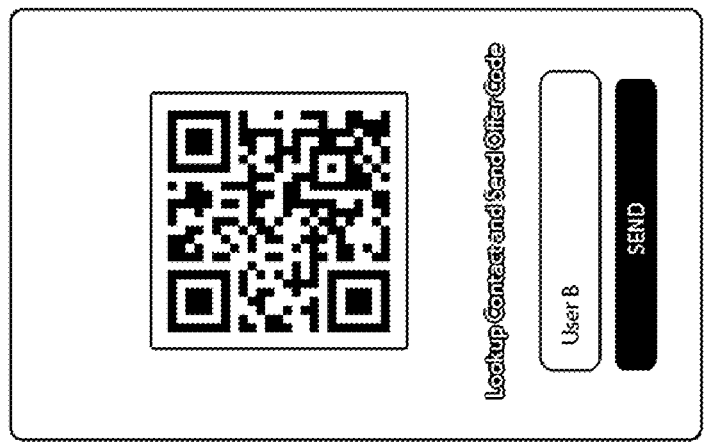
Figure 7F:
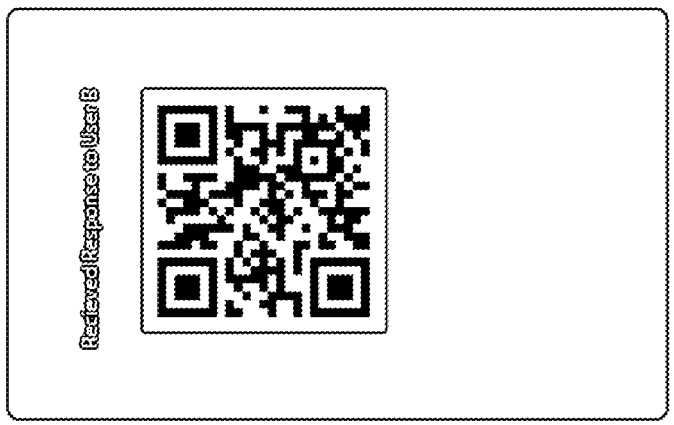
Figure 7E:
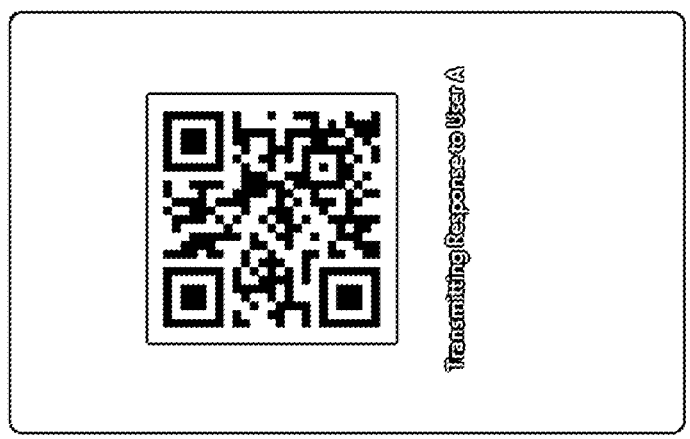
Figure 7D:
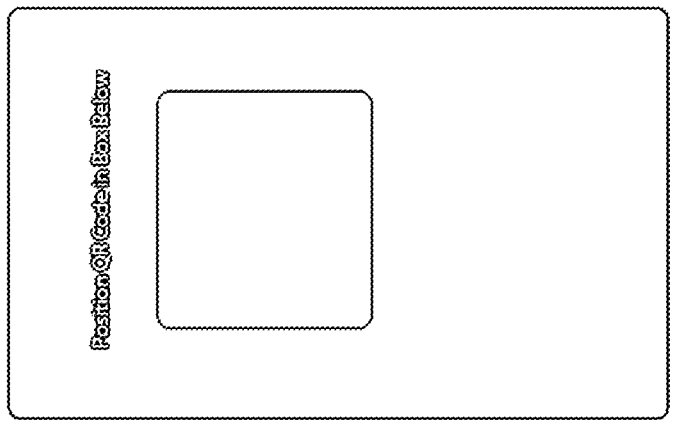
Figure 8A:
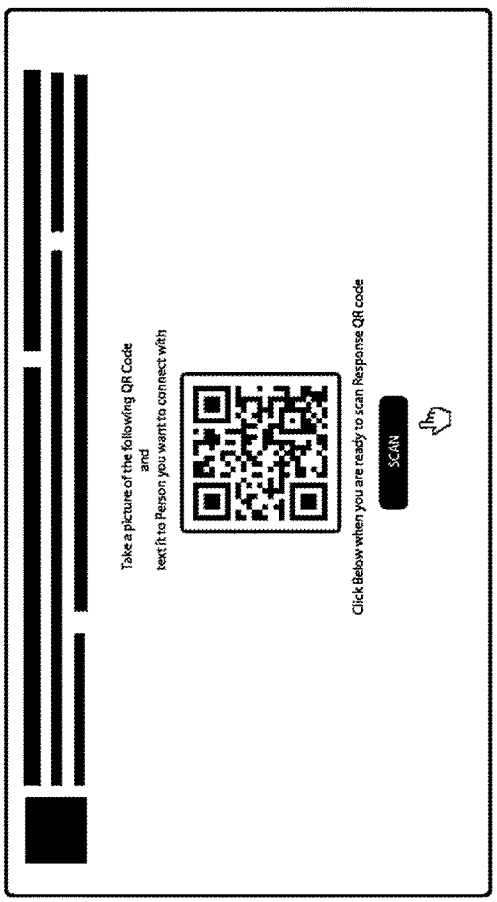
FIGS. 8A, 8B and 8C are sample screenshots illustrating an example P2P communication establishment screen on the first client device generated responsive to receipt of the SDP response message from the second client device, during P2P communication session establishment processing.
Figure 8B:
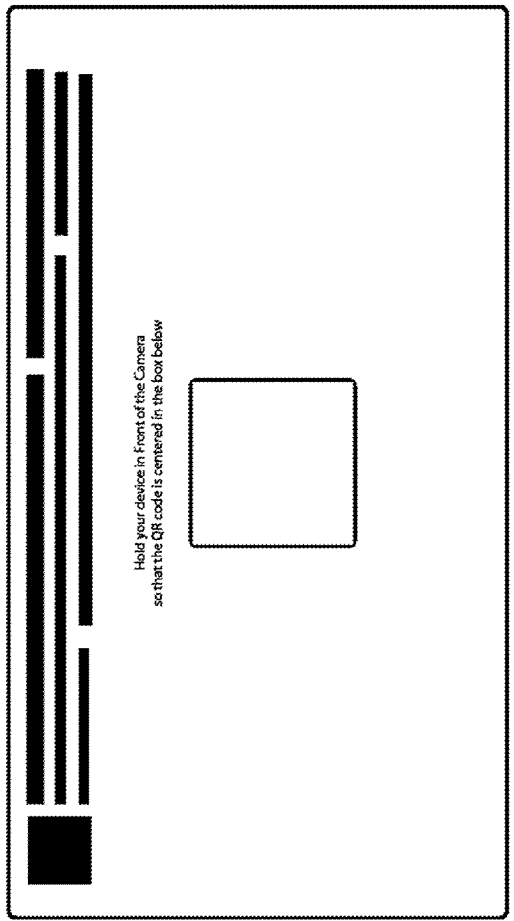
Figure 8C:
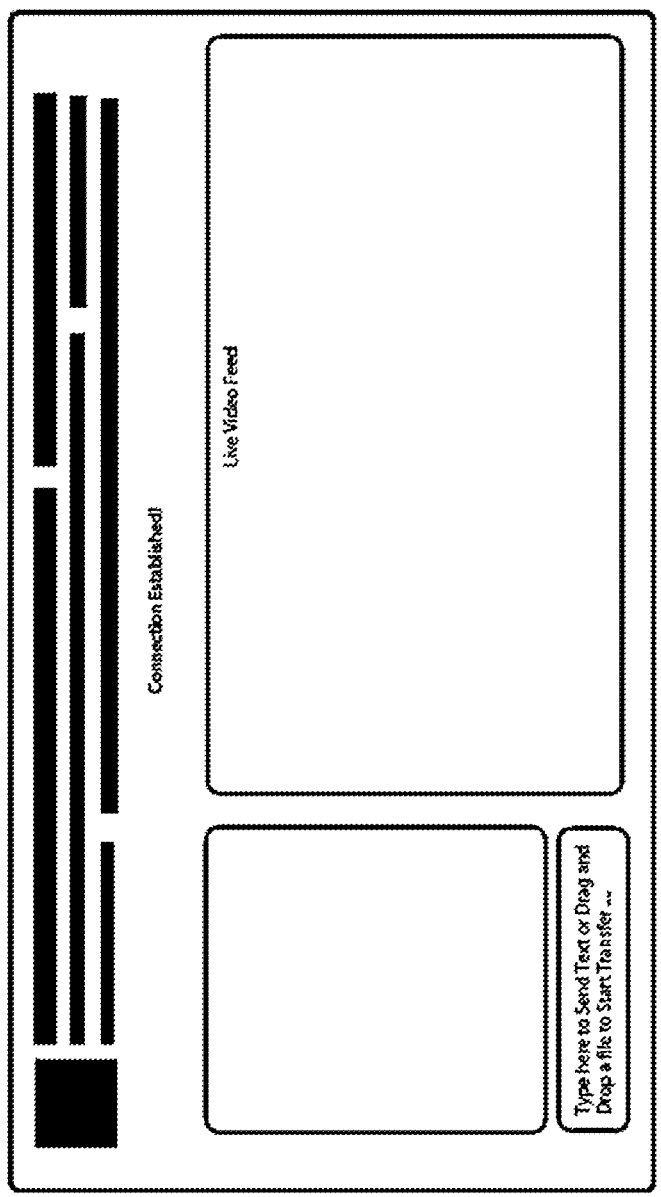

Referring next to FIGS. 6A-8C, an example of establishing a P2P connection is described from a perspective of example web browser screenshots on the client devices 12-1, 12-2 and example application screenshots on the mobile devices 14-1, 14-2. In particular, FIGS. 6A-6F illustrate an example P2P communication session request screen and SDP offer message transmission from the first client device 12-1 to the second client device 12-2 via the respective mobile devices 14-1, 14-2; FIGS. 7A-7F illustrate an example P2P communication session joining screen and an SDP response message transmission from the second client device 12-2 to the first client device 12-1 via the respective mobile devices 14-1, 14-2; and FIGS. 8A-8C illustrate establishment of a P2P communication session.

Referring to FIGS. 6A-6F, in the example, User A, on the first client device 12-1, chooses to start a P2P communication session using the "QR Code" option on a web browser that visits a website associated with the P2P connection service (FIG. 6A). The web browser generates an Offer SDP message encoded as a QR code (FIG. 6B). Using an application on the first mobile device 14-1, User A chooses a "Scan QR Code" option to capture the offer message (FIG. 6C). The application instructs User A on how to capture the Offer QR Code (FIG. 6D). User A uses the application on the first mobile device 14-1 to choose "User B" as the recipient of offer code and clicks Send (FIG. 6E). An application on User B's mobile device 14-2 receives the Offer QR Code (from the first mobile device 14-1) and displays a notification to the User B (FIG. 6F).

Referring to FIGS. 7A-7F, User B, on the second client device 12-2, uses the web browser to visit the website associated with the P2P connection service, and chooses to scan a received QR code (to join a requested P2P communication session) (FIG. 7A). The web browser, on the second client device 12-2, instructs User B on how to scan offer QR code (FIG. 7B). The web browser generates a Response QR code and instructs User B on how to send the Response QR code back to the first mobile device 14-1 (FIG. 7C). Using the application on the second mobile device 14-2, User B scans the Response QR code (FIG. 7D). The application on the second mobile device 14-2 transmits the Response QR Code back to User A on the first mobile device 14-1 (FIG. 7E). The application on User A's mobile device 14-1 receives the Response QR Code (from the second mobile device 14-2) and displays a notification to the User A (FIG. 7F).

Referring to FIGS. 8A-8C, User A, on the first client device 12-1, uses the web browser to click "Scan" on the web browser to start scanning the received Response QR Code (FIG. 8A). User A, on the first client device 12-1, is instructed by the web browser to scan the Response QR Code (FIG. 8B). Response to the scanned Response QR Code, a WebRTC Connection is then established between User A (client device 12-1) and User B (client device 12-2) (FIG. 8C). The participating website can now directly transmit text, video, files and other forms of data between the web browsers.

FIGS. 9A and 9B illustrate examples of software code that may be used to establish a P2P communication session. The software code may be implemented, for example, in a Mozilla Firefox console. FIG. 9A illustrates an example of generating an SDP offer message from the first client device 12-1. The generated offer message may be used to create a QR code from any one suitable text to QR converter. The QR code may be translated back to text at the second client device 12-2. FIG. 9B illustrates an example of generating an SDP response message at the second client device 12-2. The SDP response message may be transferred to the first client device 12-1 (for example, as a QR code, an encoded sound byte, text, etc.), as discussed above. Information in the SDP response message may be used to complete a handshake process and establish the P2P connection between the first client device 12-1 and the second client device 12-2.

As shown by the above discussion, functions relating to the P2P connection service may be implemented on computers connected for data communication via the components of a packet data network, as shown in FIG. 1. Each of client devices 12-1, 12-2 and mobile devices 14-1, 14-2 may be implanted on general purpose computers so as to implement the P2P connection functions discussed above, albeit with an appropriate network connection for data communication, appropriate user interface elements and appropriate programming.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for the P2P connection service. For each of the computer platforms, the software code is executable by the general-purpose computer. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for the P2P connection service, in essentially the manner performed in the implementations discussed and illustrated herein.

FIGS. 10 and 11 provide functional block diagram illustrations of general purpose computer hardware platforms. FIG. 10 illustrates a network or host computer platform, as may typically be used to implement a server (which may be a component of a packet data network). FIG. 11 depicts a computer with user interface elements, as may be used to implement a personal computer or other type of work station or terminal device, although the computer of FIG. 11 may also act as a server if appropriately programmed. It is believed that the general structure and general operation of such equipment as shown in FIGS. 10 and 11 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 11). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the P2P connection service outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms. Non-volatile storage media include, for example, optical or magnetic disks, such as any of the storage devices in any computer(s) or the like, such as may be used to implement the aspects shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge. Many of these forms of non-transitory computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

APPENDIX

Acronym List

The description above has a large number of acronyms to refer to various devices, messages and system components. Although generally known, use of several of these acronyms is not strictly standardized in the art. For the convenience of the reader, the following list correlates terms to acronyms, as used by way of example in the detailed description above.

API—Application Programming Interface
BS—Base Station
CDN—Content Delivery Network
CD-ROM—Compact Disk Read Only Memory
CPU—Central Processing Unit
DVD—Digital Video Disk
DVD-ROM—Digital Video Disk Read Only Memory
EEPROM—Electrically Erasable Programmable Read Only Memory
EMS—Enhanced Messaging Service
EPROM—Erasable Programmable Read Only Memory
FLASH-EPROM—Flash Erasable Programmable Read Only Memory IP—Internet Protocol
MMS—Multimedia Messaging Service
PROM—Programmable Read Only Memory
P2P—Peer-To-Peer
PC—Personal Computer
PDA—Personal Digital Assistant
QR—Quick Response
RAM—Random Access Memory
RF—Radio Frequency
RIM—Research In Motion
ROM—Read Only Memory
SDP—Session Description Protocol
SMS—Short Message Service
WebRTC—Web Real-Time Communication

What is claimed is:

1. A method comprising:
receiving, at a first client device, a request to initiate a peer-to-peer connection with a second client device;
providing, for presentation and by the first client device, an offer message based on receiving the request,
the offer message being embedded in a Quick Response (QR) code,
the offer message including first address information associated with the first client device, and
the offer message being captured by a first mobile device and sent to the second client device via a second mobile device;
receiving, by the first client device via the first mobile device and the second mobile device, a response message over a wireless communication network from the second client device,
the response message including second address information associated with the second client device, and
the response message being received based on the response message being captured by the second mobile device and sent to the first client device via the first mobile device; and
initiating, by the first client device and based on the second address information in the response message, the peer-to-peer connection with the second client device,
the peer-to-peer connection with the second client device being initiated via the first mobile device and the second mobile device without use of a server dedicated to the peer-to-peer connection, and
the second mobile device being associated with the second client device.

2. The method of claim 1, wherein the offer message sent by the first mobile device or the response message received by the first mobile device comprises at least one of:
a short message service (SMS) message,
an enhanced messaging service (EMS) message,
a multimedia messaging service (MMS) message,
a voicemail message, or
an email.

3. The method of claim 1, wherein the offer message is a first offer message; and
wherein the method further comprises:
providing, for presentation, a second offer message as at least one of:
text information,
image information,
video information, or
audio information.

4. The method of claim 1, wherein the captured offer message is a first offer message; and
wherein a second offer message is captured by the first mobile device,
the captured second offer message comprising at least one of:
an audio representation of the second offer message presented by the first client device, or
an image representation of the second offer message presented by the first client device.

5. The method of claim 1, wherein receiving the response message over the wireless communication network from the second client device comprises:
receiving the response message based on:
an identification of the second mobile device.

6. The method of claim 1, wherein receiving the response message over the wireless communication network from the second client device comprises:
receiving the response message based on:
the offer message being provided for presentation to the second client device via the second mobile device,
the offer message being captured by the second client device, and
the response message being generated by the second client device based on the offer message being captured by the second client device.

7. The method of claim 1, wherein receiving the response message over the wireless communication network from the second client device comprises:
receiving the response message based on:
the response message being provided for presentation to the second mobile device;
the response message being captured by the second mobile device; and
the response message being sent to the first mobile device via the wireless communication network.

8. The method of claim 1, wherein receiving the response message over the wireless communication network from the second client device comprises:
receiving the response message based on:
the response message being provided for presentation to the first client device, and
the response message being captured by the first client device; and
wherein initiating the peer-to-peer connection with the second client device comprises:
initiating the peer-to-peer connection based on the response message being captured by the first client device.

9. The method of claim 1, wherein the peer-to-peer connection includes a Web Real-Time Communication (WebRTC) connection.

10. The method of claim 1, wherein the offer message comprises at least one of:
one or more protocols for transmission of data, or
one or more types of data to be exchanged via the peer-to-peer connection.

11. A first mobile device, comprising:
a wireless mobile transceiver;
a memory to store instructions; and
a processor, to execute the instructions, to:
capture an offer message, from a first client, relating to initiation of a requested peer-to-peer communication session between the first client and a second client, the offer message being embedded in a Quick Response (QR) code;
send, via the wireless mobile transceiver, the captured offer message to a second mobile device, the second mobile device sending the captured offer message to the second client;

receive a response message, via the wireless mobile transceiver and the second mobile device, from the second client, the response message including second address information associated with the second client, and the response message being received based on the response message being captured by the second mobile device; and provide the response message to the first client, based on the second address information in the response message, to enable the first client to initiate the peer-to-peer communication session with the second client, the peer-to-peer communication session with the second client being initiated without use of a server dedicated to the peer-to-peer communication session.

12. The first mobile device of claim 11, wherein the processor, when providing the response message to the first client, is to:

provide the response message as at least one of:
text information,
image information,
video information, or
audio information.

13. The first mobile device of claim 11, wherein the offer message is a first offer message; and wherein the processor is further to:
capture an audio representation of a second offer message.

14. The first mobile device of claim 11, wherein the processor is further to:

receive, via a user interface element, a user selection identifying the second mobile device; and wherein the processor, when sending, via the wireless mobile transceiver, the captured offer message to the second mobile device, is to:

send, via the wireless mobile transceiver, the captured offer message to the second mobile device based on the user selection identifying the second mobile device.

15. The first mobile device of claim 11, wherein the peer-to-peer communication session includes a Web Real-Time Communication (WebRTC) connection.

16. The first mobile device of claim 11, wherein the processor, when providing the response message to the first client, is to:

provide, for presentation, the response message to the first client for capture by the first client.

17. A non-transitory computer readable medium storing instructions, the instructions comprising:

a plurality of instructions that, when executed by a processor of a first device, cause the processor to:
receive a request to initiate a peer-to-peer connection with a second device;

provide, for presentation, an offer message based on receiving the request, the offer message being embedded in a Quick Response (QR) code, the offer message including first address information associated with the first device, the offer message being captured by a third device, and the captured offer message being sent, via a fourth device, to the second device;

receive, via the third device and the fourth device, a response message from the second device, the response message including second address information associated with the second device, and the response message being received based on the response message being captured by the fourth device and sent to the first device via the third device; and initiate the peer-to-peer connection with the second device based on the second address information in the response message, the peer-to-peer connection with the second device being initiated without use of a server dedicated to the peer-to-peer connection.

18. The non-transitory computer readable medium of claim 17, wherein the offer message is a first offer message; and wherein the plurality of instructions, when executed by the processor, further cause the processor to:

provide, for presentation, a second offer message as at least one of:
text information,
image information,
video information, or
audio information.

19. The non-transitory computer readable medium of claim 17, wherein the captured offer message is a first offer message; and wherein a second offer message is captured by the third device, the second captured offer message comprising an audio representation of the second offer message.

20. The non-transitory computer readable medium of claim 17, wherein the plurality of instructions, that cause the processor to receive the response message, further cause the processor to:

receive the response message by capturing the response message based on the response message being provided for presentation by the third device; and wherein the plurality of instructions, that cause the processor to initiate the peer-to-peer connection with the second device, cause the processor to:

initiate the peer-to-peer connection with the second device based on capturing the response message.

* * * * *